United States Patent
Markarian et al.

(10) Patent No.: US 11,492,180 B2
(45) Date of Patent: Nov. 8, 2022

(54) FRESHNESS PLUG

(71) Applicant: Contempo Card Company, Providence, RI (US)

(72) Inventors: Michael Markarian, Tiverton, RI (US); Manuel Cordeiro, Coventry, RI (US); Vark Markarian, Sr., Cranston, RI (US)

(*) Notice: Subject to any disclaimer, the term of this patent is extended or adjusted under 35 U.S.C. 154(b) by 0 days.

(21) Appl. No.: 16/903,614

(22) Filed: Jun. 17, 2020

(65) Prior Publication Data

US 2020/0407125 A1 Dec. 31, 2020

Related U.S. Application Data

(60) Provisional application No. 62/945,891, filed on Dec. 10, 2019, provisional application No. 62/869,635, filed on Jul. 2, 2019, provisional application No. 62/862,461, filed on Jun. 17, 2019.

(51) Int. Cl.
*B65D 43/02* (2006.01)
*B65D 39/00* (2006.01)
*B65D 39/08* (2006.01)
*B33Y 80/00* (2015.01)

(52) U.S. Cl.
CPC ....... *B65D 43/022* (2013.01); *B65D 39/0023* (2013.01); *B65D 39/088* (2013.01); *B33Y 80/00* (2014.12); *B65D 2543/00296* (2013.01); *B65D 2543/00509* (2013.01); *B65D 2543/00685* (2013.01)

(58) Field of Classification Search
CPC .... B65D 39/0041; B65D 39/04; B65D 39/16; B65D 43/022; B65D 39/0023; B65D 39/088; B65D 2543/00296; B65D 2543/00509; B65D 2543/00685; B33Y 80/00

USPC ............ 220/801, 805, 258.2; 215/296, 355; 206/90, 91, 92, 94, 95, 137

See application file for complete search history.

(56) References Cited

U.S. PATENT DOCUMENTS

| | | | | | |
|---|---|---|---|---|---|
| 1,209,759 | A | * | 12/1916 | Richter | B65D 85/109 206/94 |
| 2,483,964 | A | * | 10/1949 | Bennett | B65D 39/088 220/284 |
| 2,492,176 | A | * | 12/1949 | Walter | B65D 39/088 228/164 |
| 2,663,451 | A | * | 12/1953 | Yarnall | B65D 39/0023 220/805 |
| 5,496,141 | A | * | 3/1996 | Popsys | B65D 39/0023 138/89 |
| 2005/0242054 | A1 | * | 11/2005 | Stull | B65D 41/325 215/252 |
| 2006/0278653 | A1 | * | 12/2006 | Zeyfang | F16L 57/005 220/801 |
| 2012/0241453 | A1 | * | 9/2012 | Palmer | B65D 47/06 220/254.3 |
| 2015/0096988 | A1 | * | 4/2015 | Weyrauch | B65D 39/08 220/284 |

(Continued)

*Primary Examiner* — J. Gregory Pickett
*Assistant Examiner* — Niki M Eloshway
(74) *Attorney, Agent, or Firm* — Virtual IP Law, LLC

(57) ABSTRACT

A freshness plug includes a solid round body having an internally depressed section, a protrusion extending from the internally depressed section, a shoulder extending from an exterior of the internally depressed section, and malleable flanges below the shoulder.

20 Claims, 6 Drawing Sheets

(56) References Cited

U.S. PATENT DOCUMENTS

2018/0265265 A1\* 9/2018 Hannigan .............. B65D 39/00
2021/0016935 A1\* 1/2021 Gregorian .............. B65D 39/04

\* cited by examiner

FRESHNESS PLUG

CROSS-REFERENCE TO RELATED APPLICATIONS

This application claims benefit from U.S. Provisional Patent Application Ser. No. 62/862,461, filed Jun. 17, 2019, U.S. Provisional Patent Application Ser. No. 62/869,635, filed Jul. 2, 2019, and U.S. Provisional Patent Application Ser. No. 62/945,891, filed Dec. 10, 2019, which are incorporated by reference in their entireties.

BACKGROUND OF THE INVENTION

The invention generally relates to storage, and more specifically to a freshness plug.

In general, sealing is a common method for removing atmospheric oxygen from a container. This method is an effective way to preserve foods or other internal products that lose flavor, scent or ripeness when exposed to oxygen.

For example, a plug is a device specifically made to seal the container. It usually includes a shoulder on the exterior surface which engages the container to stabilize the plug, malleable flanges which depress and form a tightly sealed environment inside of the container and a handle to help remove the plug. In many cases, plugs also contain a seal or valve which assist in removal the oxygen from the container. When the user inserts the plug, oxygen flows out past the malleable flanges and once the plug is in place the malleable flanges depress against the container forming a tightly sealed environment.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a plug capable of being inserted into a storage container having an interior space including a body, means in which to stabilize said body to the storage container in which said plug is inserted, means in which to remove some air from the interior space within the storage container in which the plug is inserted, and means in which to insert and remove said plug from a storage container in which said plug is inserted.

In another aspect, the invention features a plug including a solid round body having an internally depressed section, a protrusion extending from the internally depressed section, a shoulder extending from an exterior of the internally depressed section, and malleable flanges below the shoulder.

The invention may include one or more of the following advantages.

The present invention creates a better seal on a container by using both the flanges to push out the air, and automation friendly as rests on the top of the jar.

The present invention provides users with an easy, cheap and efficient method for preserving the freshness of a container's internal contents.

The present invention is automation friendly because its use is not limited to straight-wall containers.

The present invention solves the current issue by providing users with the option to remove the plug and subsequently re-insert the plug into the container for an efficient and effective continued preservation of the container's internal contents.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE INVENTION

Figure 1:
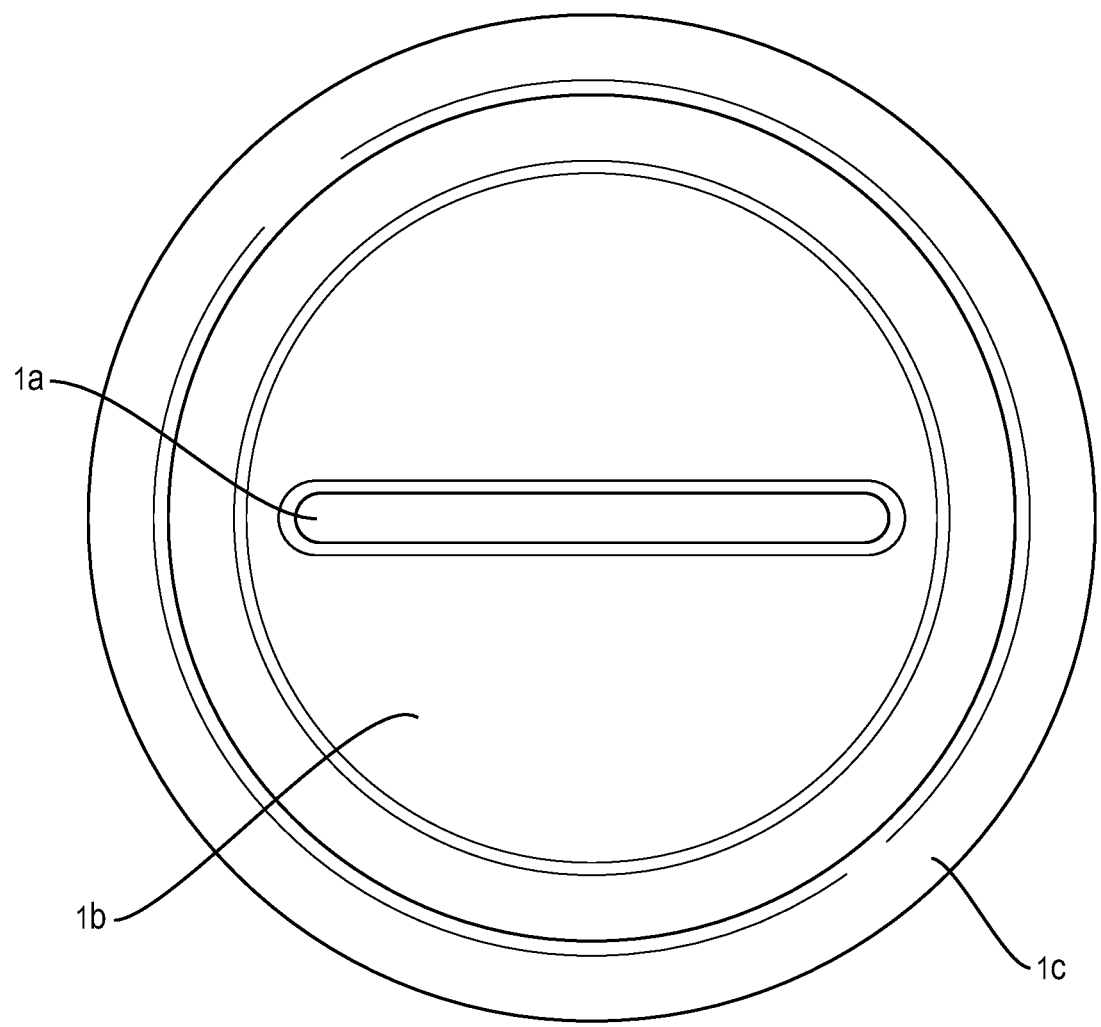
FIG. 1 is a top view of an exemplary freshness plug.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Traditionally, sealing methods required users to insert the suction end of a vacuum into a whole in the vacuum lid and manually remove air. However, once the lid was subsequently removed the process had to be performed again to recreate the environment. This process was inefficient and costly for users who did not themselves own the necessary equipment. Other less effective alternatives include air-tight lids, but these lids trap air inside of the container and leave the internal contents exposed to the trapped air.

More recently, the cannabis industry has remained primitive with the design of their containers. Commonly used cannabis containers include straight-wall glass jars, pop-top containers, rounded wide mouth glass jars and the most advanced of the containers; the UV glass jars with an air-tight screw. The present invention is compatible with these containers and can be used to enhance the freshness preservation. The practical containers may keep out damaging UV rays and oxygen which is critical to the preservation of cannabis. The only downfall is that while they keep oxygen out of the container, they also trap existing oxygen inside of the container. The present invention pushes oxygen out of the container providing a vacuum oxygen-free environment inside of the container. It has been shown that dry ingredients that have a shelf life of six months when conventionally stored have an increase in shelf life to up to two years when in a vacuum sealed environment.

Most existing solutions are internal lids that are only compatible with straight-wall containers due to their inability to conform to the shape of the container. The present invention is automation friendly because its design is compatible with all containers. A shoulder which sits the freshness plug on the top of the container enables it to work with jars, slanted-wall containers and other containers which do not have a straight wall. Moreover, the present invention can also be used internally in straight-wall containers making it universally applicable.

Reference throughout this specification to "plug" is used. One ordinarily skilled in the art will recognize that embodiments of the invention should not be limited to these terms and that the terms are used as a general term for any plug for covering any object that would benefit from the described invention.

Reference throughout this specification to "container" is used. One ordinarily skilled in the art will recognize that embodiments of the invention should not be limited to these terms and that the terms are used as a general term for any base that can be covered and would benefit from the described invention.

As used herein, the term "cover" refers the act of sealing off the opening of a traditional container so that atmospheric oxygen is unable to enter into the container.

As used herein, the term "handle" refers the any device that can be used to remove an object from a container.

As used herein, the term "shoulder" refers the edge of the jar where the freshness plug sits.

As used herein, the term "body" refers the internal portion of the device containing the upward ascending walls and base forming a cup structure.

As an overview, one embodiment the invention is disclosed for a sealing device that allows users to quickly and easily transition the container internal environment between oxygen and oxygen-free while ultimately preserving the quality of the internal contents. The sealing device is designed with an external shoulder which engages with the internal surface of the container for device stability, malleable flanges which depress against the internal region of the container forming a tightly sealed environment and a handle to remove the lid once inserted. The flanges, which create a good seal, also sit on the top of the jar.

The sealing device is designed to cover the entire internal circumference of the opening of a container. The device may also be used to extinguish fire or contain foul odors by covering other container openings such as candles or garbage cans. It should be noted that the freshness plug may have various shapes, other than round body, and should not be limited to this particular shape.

FIG. 1 illustrates a three dimensional top view of an exemplary freshness plug that includes a solid round body having an internally depressed section (1b) (hereinafter referred to as the "cup"); with the chamber including a protrusion (1a) (hereinafter referred to as the "handle") and extending from the exterior of the chamber is a raised flat surface (1c) (hereinafter referred to the "shoulder"). The handle 1a may include gripping features to aid in the insertion and removal of the freshness plug.

Figure 2:
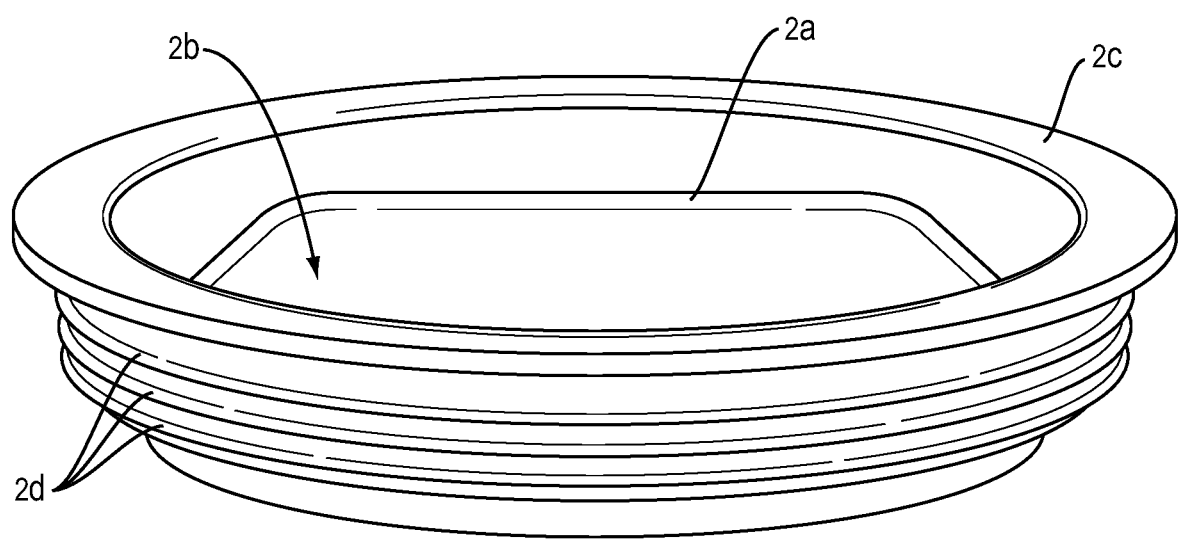
FIG. 2 is side view of the exemplary freshness plug.
Figure 3:
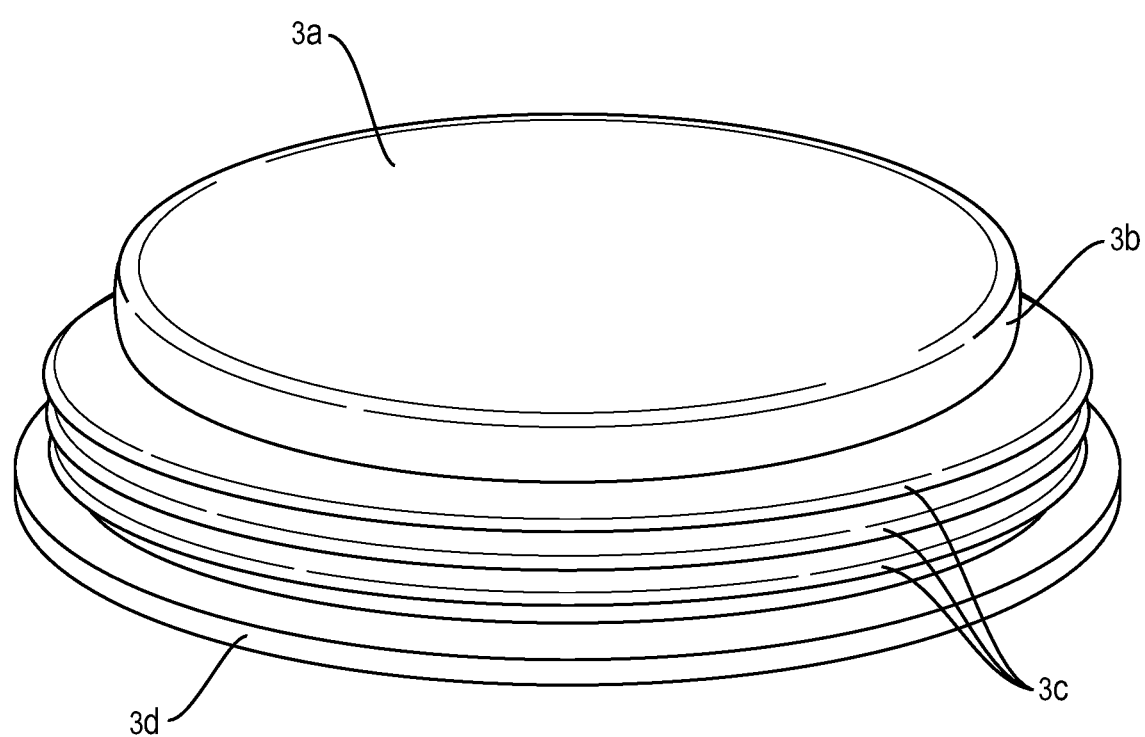
FIG. 3 is bottom view of the exemplary freshness plug.

FIG. 2 is a side view of the freshness plug including, generally, a handle (2a) protruding from the chamber (2b) with a shoulder (2c) extending from the exterior portion of said chamber. This embodiment further includes additional protrusions (2d) below the shoulder (hereinafter referred to as the "malleable flanges");

FIG. 3 is an upside-down representation of the side view of the freshness plug including, generally, a flat base (3a) and the rounded side (3b) having a circumference less than the circumference of the malleable flanges (3c) and shoulder (3d).

Figure 4:
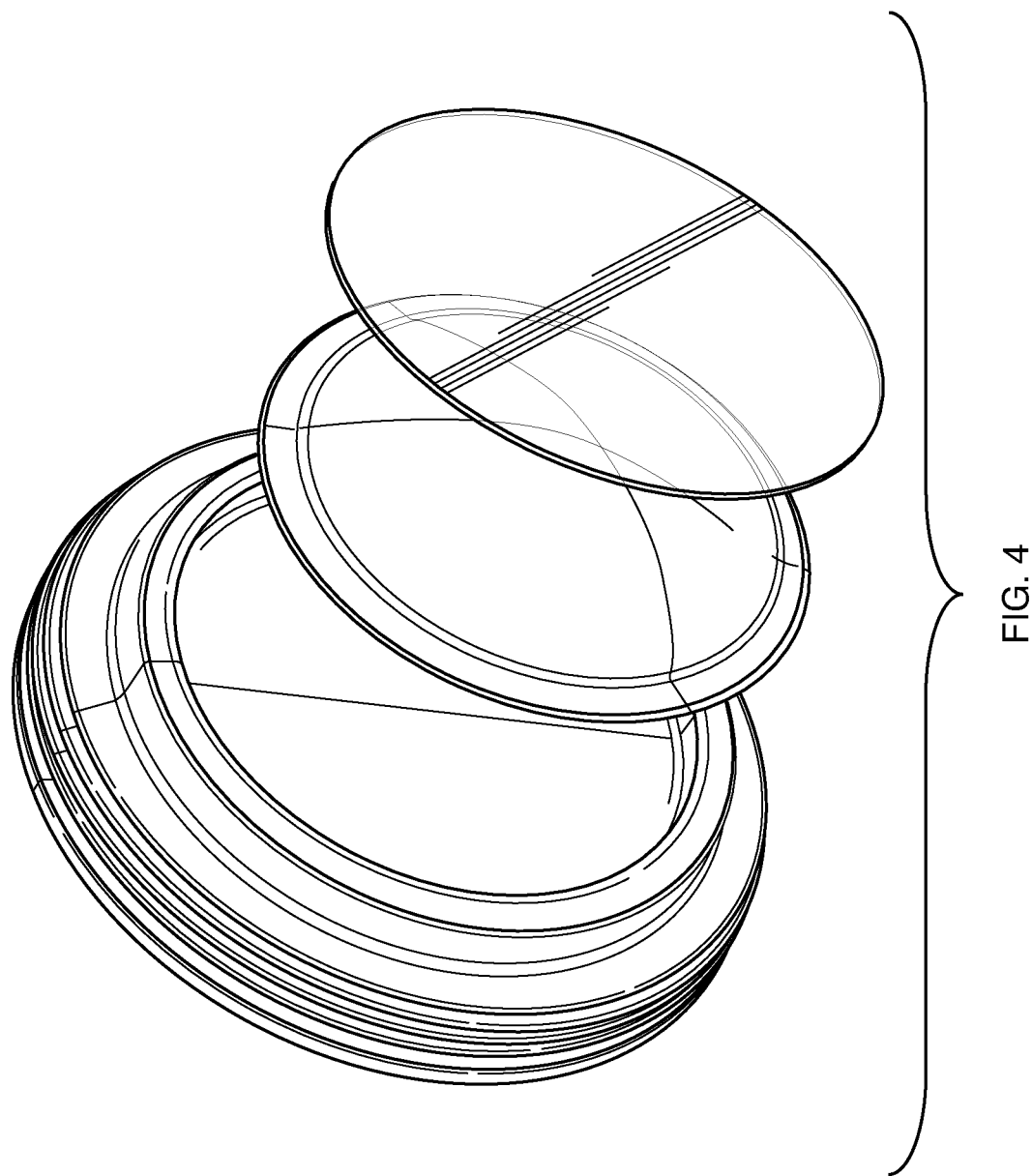
FIG. 4 is a view of an exemplary porous attachment.
Figure 5:
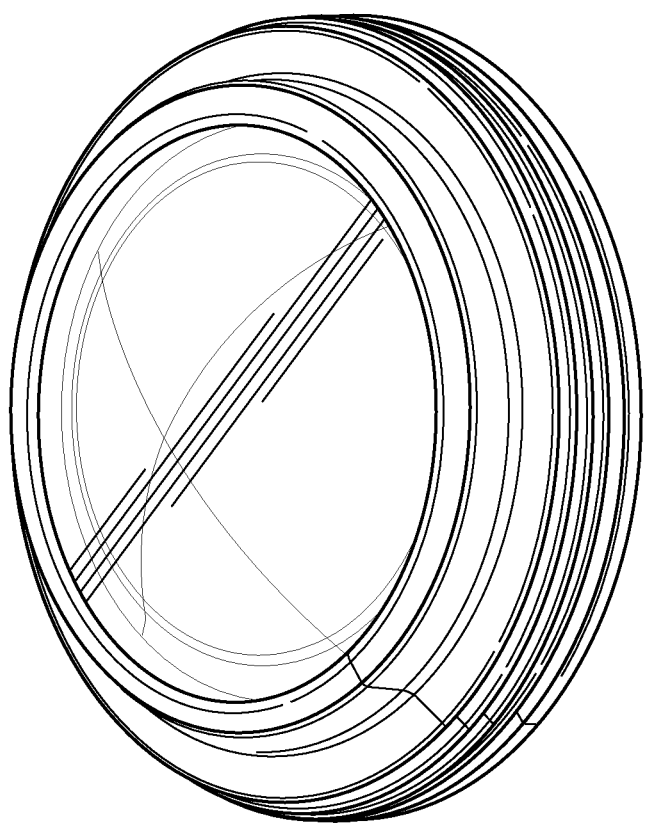
FIG. 5 is an another view of the exemplary porous attachment.
Figure 6:
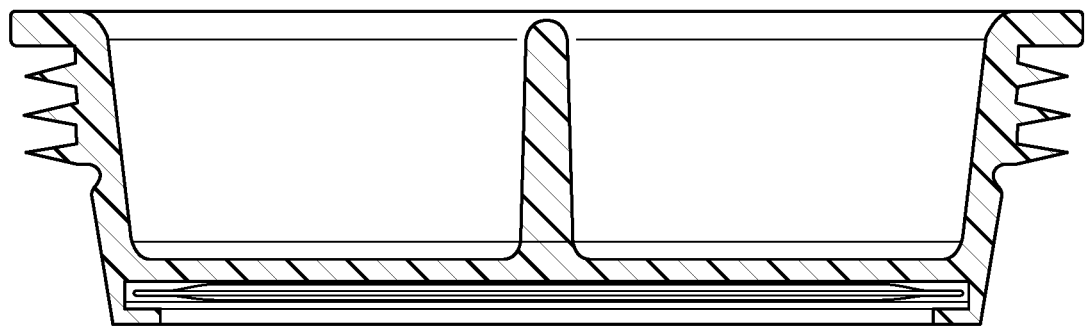
FIG. 6 is a plug with the exemplary porous attachment.

FIGS. 4-6 illustrate views of an exemplary porous attachment.

Generally, the freshness plug includes a body having a depressed internal space with upward extending walls 3b, an open-end 1b and 2b and a base 3a to form a cup that users can use as a space to insert their fingers to grab the handle which protrudes from the base of the cup 1a and 2a allowing users to insert and remove the plug from the container. The shoulder extends off the external circumference of the open end of the cup 1c, 2c and 3d to engage the container providing stability on the top of any container and the malleable flanges 2d and 3c are connected to the outer circumference of the cup located below the shoulder remove some air from within the container.

In the preferred embodiment the cup is durable for added stability. In another embodiment the cup can be made from less-durable materials to from collapsible side walls and allowing the base to expand downwards into the cup or upwards out of the cup. The functionality can allow the user to pull the cup portion out of the container to form a nipple like those on a baby bottle. The user can also push the cup portion into the container forming a space for multiple uses including but not limited to storage and measuring out solid and liquid materials.

In the preferred embodiment the base of the cup has a flat external portion 1b which contains a handle 1a. It should be appreciated that the external surface of the base can also be made with any attachment selected from a group including but not limited to, a match pad for striking and lighting a match and a chalk pad for writing instructions such as dosages or other information.

In the preferred embodiment the cup has a flat base 3a. It should be appreciated that the internal surface of the base of the cup can also be made with any attachment selected from a group including but not limited to, a solid storage compartment which can be used for keeping certain internal contents separate form the contents inside of the container, a porous compartment (FIGS. 4-6) which can be used for storing contents that could benefit the storage of the container's internal contents such as desiccant packets, a spoon which can be used for stirring and/or eating the container's internal contents, a dosing cup which can be used for measuring the volume of the internal contents or contents the users adds to the container, a one-way valve for removing the air from the container and creating a vacuum environment.

The cup is preferably made from durable materials. It should be appreciated that the body can be made from non-durable materials for example the collapsible cup would benefit from using less-durable materials. Materials suitable for manufacturing can be selected from a material from the group consisting of glass, lenses, glass fiber, fiberglass, clay, metal, bioplastic, flame-retardant plastic, thermoplastic, polymers, polyester resin, nylon, acrylic e-glass epoxy composite, s-glass epoxy composite, carbon-fiber reinforced polymer, nanodispersed nanoparticles, layered double hydroxides, carbon nanotubes, polyhedral silsesquioxanes and combinations thereof.

It should be appreciated that the body can be mixed with different hygroscopic substances for removing water from the surrounding environment in order to prevent spoilage, the formation of lumps or germs and preserve the crispness of the internal contents. Materials suitable for manufacturing can be selected from a material from the group consisting of calcium oxide, silica gel, glycerin, ethanol, methanol, concentrated sulfuric acid, activated charcoal, calcium sulfate, calcium chloride, molecular sieves, salt, rice, concentrated sodium hydroxide or other chemical and natural desiccants.

It should be appreciated that the body can be made from different materials with the shoulder and malleable flanges being affixed to the cup after all parts are manufactured separately. The parts of the freshness plug may be formed by any known process or will be known in the art to make solid structures made from any solid substance, including but not limited to, one-shot molding, two-shot molding, or multi-material injection molding. The process used to make the body is dependent on the type of materials used for each component of the body. If all materials differ in type then a one shot molding may be less desirable.

The parts of the freshness plug may be formed by any known process will be known in the art to make solid structures made from any solid substance, including but not limited to, ejection molding, 3D printing, rotational molding, injection molding, thermoforming, compression molding, blow molding, reaction injection molding, vacuum casting and resin casting. The technique used to make the body may vary depending on the type of material used to make the shoulder as well as the desired quality and cost of the final product.

The plug can be used with containers to store a variety of contents including but not limited to, food, tobacco, cannabis, liquids and other contents capable of fitting inside of the container. These uses can be commercial uses, hardware uses, home uses, farm uses or military uses. For example, items can be sealed in containers for removing some air from within a container, preventing spillage, preventing freezer burn, preventing evaporation of volatile components, limiting growth of aerobic bacteria or fungi, containing foul odors, determining dosages, extinguishing flames and reducing theft of internal contents.

The Shoulder

In the preferred embodiment the shoulder has an outer circumference that is greater than the inner circumference of the container allowing the plug to sit on the top of the container after engaging the upper lip of the container 1c, 2c and 3d. In another embodiment the shoulder can have an outer circumference that is equal to or less than the inner circumference of the container allowing the plug to slide into a straight walled container; or in a slanted-wall container where the side-wall slants outward having the greatest circumference at the base of the container and the smallest base at the lip of the container, the shoulder can engage the lip of the container.

In the preferred embodiment the shoulder will be a disc shape 1c, 2c and 3d to accommodate the more common round containers. It should be appreciated that the shoulder can be made in various shapes depending on the shape of the container. The possible shapes for the shoulder including but is not limited to, a heart, hexagon, pentagon, polygon, diamond, star and triangle.

In the preferred embodiment the shoulder will be smooth to sit flush against the internal circumference of the container. It should be appreciated that the shoulder can be made with notches, spiral grooves, latches or other means for securing the plug to the container.

The shoulder of the freshness plug, is preferably, made from a durable material. It should be appreciated that the shoulder can be made from non-durable materials. Materials suitable for manufacturing the freshness plug include but are not limited to, glass, glass fiber, fiberglass, clay, metal, bioplastic, flame-retardant plastic, thermoplastic, polymers, polyester resin, nylon, acrylic e-glass epoxy composite, s-glass epoxy composite, carbon-fiber reinforced polymer, nanodispersed nanoparticles, layered double hydroxides, carbon nanotubes, polyhedral silsesquioxanes and combinations thereof.

The parts of the freshness plug may be formed by any known process or will be known in the art to make solid structures made from any solid substance, in particular, those mentioned previously, such as ejection molding, 3D printing, injection molding, thermoforming, compression molding, rotational molding, vacuum casting and resin casting. The technique used to make the shoulder may vary depending on the type of material used to make the shoulder as well as the desired quality and cost of the final product.

The Malleable Flanges

In the preferred embodiment the plug includes three or more malleable flanges 2d and 3c. It should be appreciated that the number of malleable flanges can increase or decrease depending on the size of the surface area for the malleable flanges to engage.

In the preferred embodiment the plug includes malleable flanges with a circumference less than or equal to the circumference of the shoulder 2d and 3c. It should be appreciated that the circumference of malleable flanges can increase or decrease depending on the internal circumference of the container. For example, in a slanted-wall container where the side-wall slants outward having the greatest circumference at the base of the container and the smallest base at the lip of the container, the flanges may have a greater circumference than the shoulder.

The malleable flanges of the freshness plug, is preferably, made from a flexible material. It should be appreciated that the shoulder can be made from durable materials. Materials suitable for manufacturing the freshness plug include but are not limited to, polymers, acrylic, butyl, polyurethane, elastomers, silicone and combinations thereof.

The parts of the freshness plug may be formed by any known process or will be known in the art to make solid structures made from any solid substance, in particular, those mentioned previously, such as ejection molding, 3D printing, injection molding, thermoforming, compression molding, rotational molding, vacuum casting and resin casting. The technique used to make the malleable flanges may vary depending on the type of material used to make the malleable flanges as well as the desired quality and cost of the final product.

The Handle

In the preferred embodiment the handle is a solid trapezoid-shaped handle 1a and 2a. It should be appreciated that the device can also be made with any handle that is known or will be known in the art, such as a T-shaped handle, drop handle, D-shaped handle C-shaped handle, rounded handle, cup handle, bow/bridge handle, square handle, boss handle, string, and a bar handle.

In the preferred embodiment the handle will be a trapezoid-shape 1a and 2a. It should be appreciated that the handle can be made in various shapes, including but not limited to, a circle, a half-circle, a heart, hexagon, pentagon, polygon, diamond, star and triangle.

Figure 7:
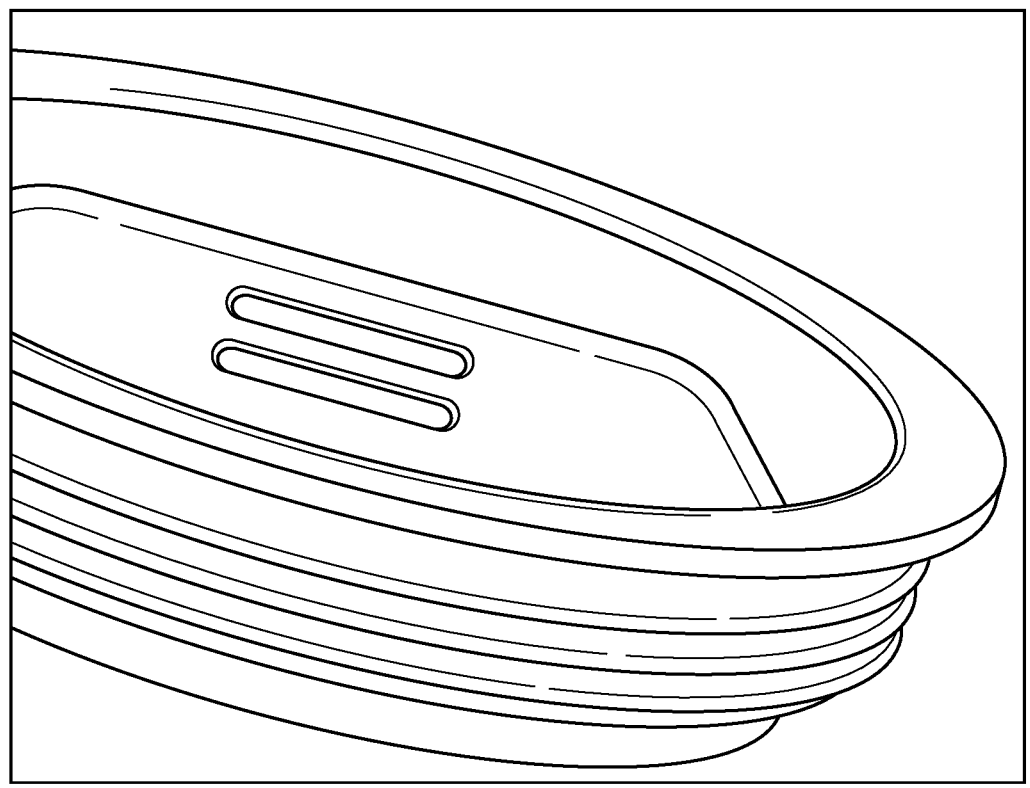
FIG. 7 is a plug with gripping features located on its protrusion.

It should be appreciated that although the image depicts a solid handle 1a and 2a, the handles can have a hollow space for the user to pinch the handle. Grooves can also be added to the handle for added grip. The shoulder can also be indented into the side of the shoulder forming a tab than can be removed by a user's fingernail. For example, FIG. 7 illustrates a plug with gripping features located on its handle.

The parts of the freshness plug may be formed by any known process or will be known in the art to make solid structures made from any solid substance, in particular, those mentioned previously, such as ejection molding, 3D printing, injection molding, thermoforming, compression molding, rotational molding, reaction injection molding, vacuum casting and resin casting. The technique used to make the handle may vary depending on the type of material used to make the handle as well as the desired quality and cost of the final product.

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

Unless otherwise indicated, all numbers expressed quantities of ingredients, reaction conditions, and so forth use in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed:

1. A plug capable of being inserted into a storage container having an interior space comprising:
    a body including one or more malleable flanges and further comprising a relatively flat base, a circular side wall extending upward form said base, and a depressed internal space;
    means in which to stabilize said body to the storage container in which said plug is inserted;
    means in which to insert and remove said plug from the storage container in which said plug is inserted; and
    a storage compartment; and
    wherein said side wall is collapsible allowing the base to be expanded downwards into said cup or upwards out of said cup and thereby change the size of said internal space, as desired.

2. The plug according to claim 1, wherein the one or more malleable flanges are located on and outer surface of said body.

3. The plug according to claim 1,
    wherein said means in which to stabilize said plug to the container includes a shoulder extending outward from an upper edge of the upward extending wall of said cup.

4. The plug recited in claim 3, wherein said shoulder includes an outer circumference equal to the inner circumference of the container.

5. The plug recited in claim 3, wherein said shoulder includes an outer circumference greater than the inner circumference of the container.

6. The plug according to claim 3, wherein said malleable flanges are connected to an outer region of said cup and are located proximate an open-end of the cup below said shoulder.

7. The plug as recited in claim 1, wherein said means in which to insert and remove said plug from a storage container in which said plug is inserted is a handle.

8. The plug as recited in claim 7, wherein said handle extends upward from the base of said body.

9. The plug according to claim 1, wherein the base of said body includes an external attachment selected from a group consisting of a match pad, a chalk pad and combinations thereof.

10. The plug according to claim 1, wherein said plug can be used with containers to store a variety of contents consisting of food, tobacco, cannabis, liquids and combinations thereof.

11. The plug according to claim 10, wherein said plug may be used to remove some air from within a container in which said plug is inserted, prevent spillage, prevent freezer burn, prevent evaporation of volatile components, limit growth of aerobic bacteria or fungi, contain foul odors, determine doses of the contents of said body or cup, extinguish flames and reduce theft of internal contents.

12. The plug recited in claim 1, wherein said body is manufactured using a manufacturing process selected from the group consisting of ejection molding, 3D printing, rotational molding, injection molding, thermoforming, compression molding, blow molding, reaction injection molding, vacuum casting and resin casting.

13. The plug according to claim 1, wherein said plug is manufactured using a manufacturing process selected from the group consisting of one-shot molding, two-shot molding, or multi-material injection molding.

14. The plug according to claim 1, wherein said plug is manufactured using a manufacturing process selected from the group consisting of one-shot molding, two-shot molding, or multi-material injection molding.

15. A freshness plug comprising:
    a solid round body comprising a cup having a relatively flat base, a circular side wall extending upward from said base and a depressed internal space;
    a protrusion extending from the internally depressed section;
    a shoulder extending from an exterior of the internally depressed section;
    one or more malleable flanges disposed below the shoulder; and
    a storage compartment.
    wherein said side wall is collapsible allowing said base to extend downwards into said cup or upwards out of said cup and thereby change the size of said internal space, as desired.

16. The freshness plug according to claim 15 wherein the protrusion extending from the internally depressed section includes gripping ridges.

17. The freshness plug according to claim 16 wherein the gripping ridges enable insertion and removal of the plug from a top of a container.

18. The freshness plug according to claim 17 wherein the shoulder extends off an external circumference of the open end of the solid round body to engage the top of the container.

19. A freshness plug insertable into a storage container having an interior space for storing products, the freshness plug comprising:
    a body comprising a cup having a base, a side wall extending upward from said base, an outer circumference, and an internal space;
    one or more malleable flanges supported by the outer circumference of the cup;

a storage compartment disposed within the body having a cavity defined by an inner surface of the base, the cavity configured and dimensioned to hold contents within the freshness plug apart from the storage container.

20. The freshness plug according to claim 19, wherein the internal space is depressed and the side wall is compressible upon insertion into the storage container, and wherein once the plug is in place the malleable flanges depress against the storage container.

\* \* \* \* \*